Sept. 12, 1933.  C. W. PARKER  1,926,495
GREASE GUN
Filed Nov. 21, 1928  2 Sheets-Sheet 2
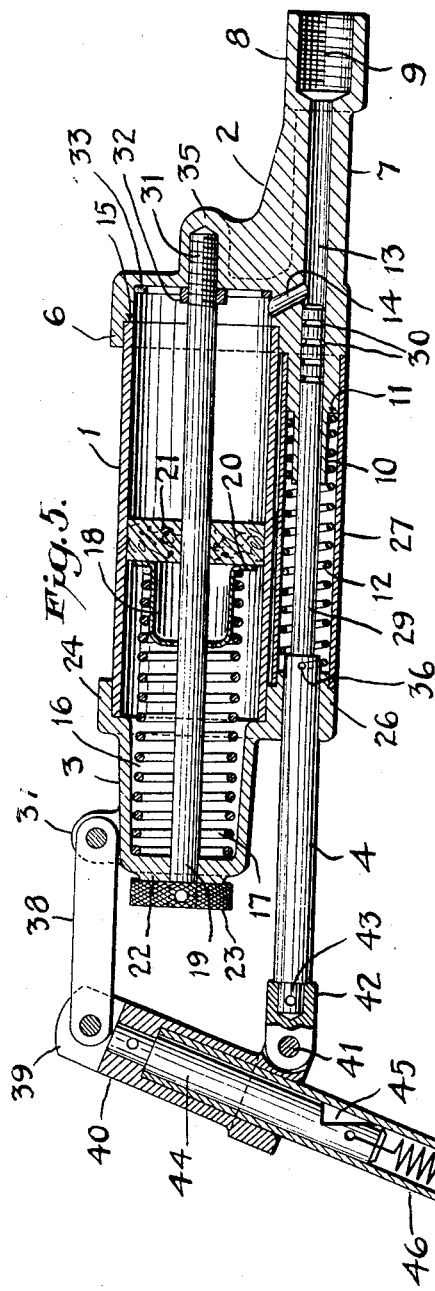
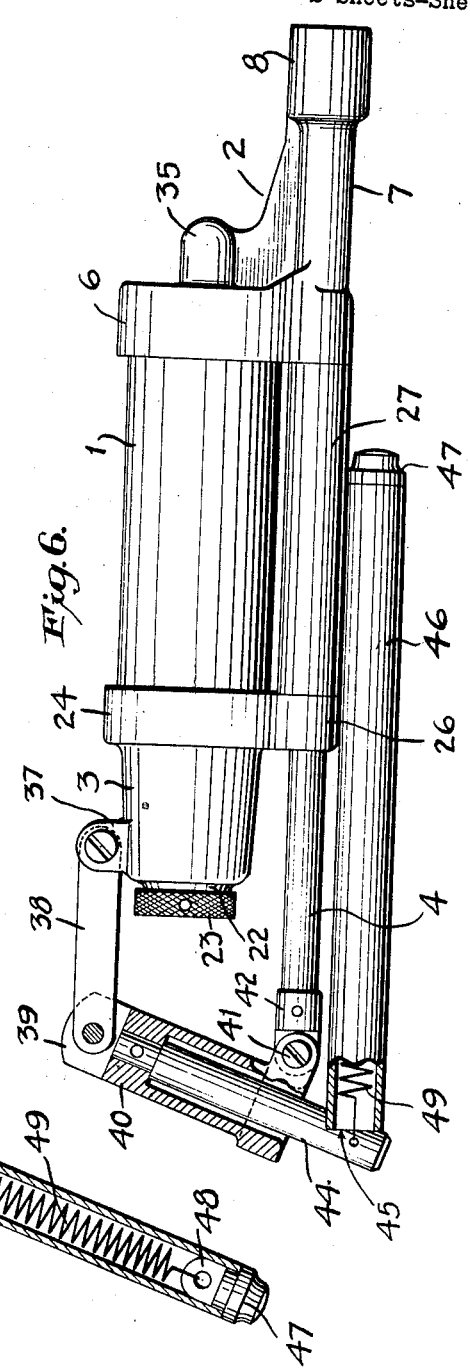
INVENTOR:
Clark W. Parker
BY Chas. McC. Chapman
ATTORNEY Patented Sept. 12, 1933

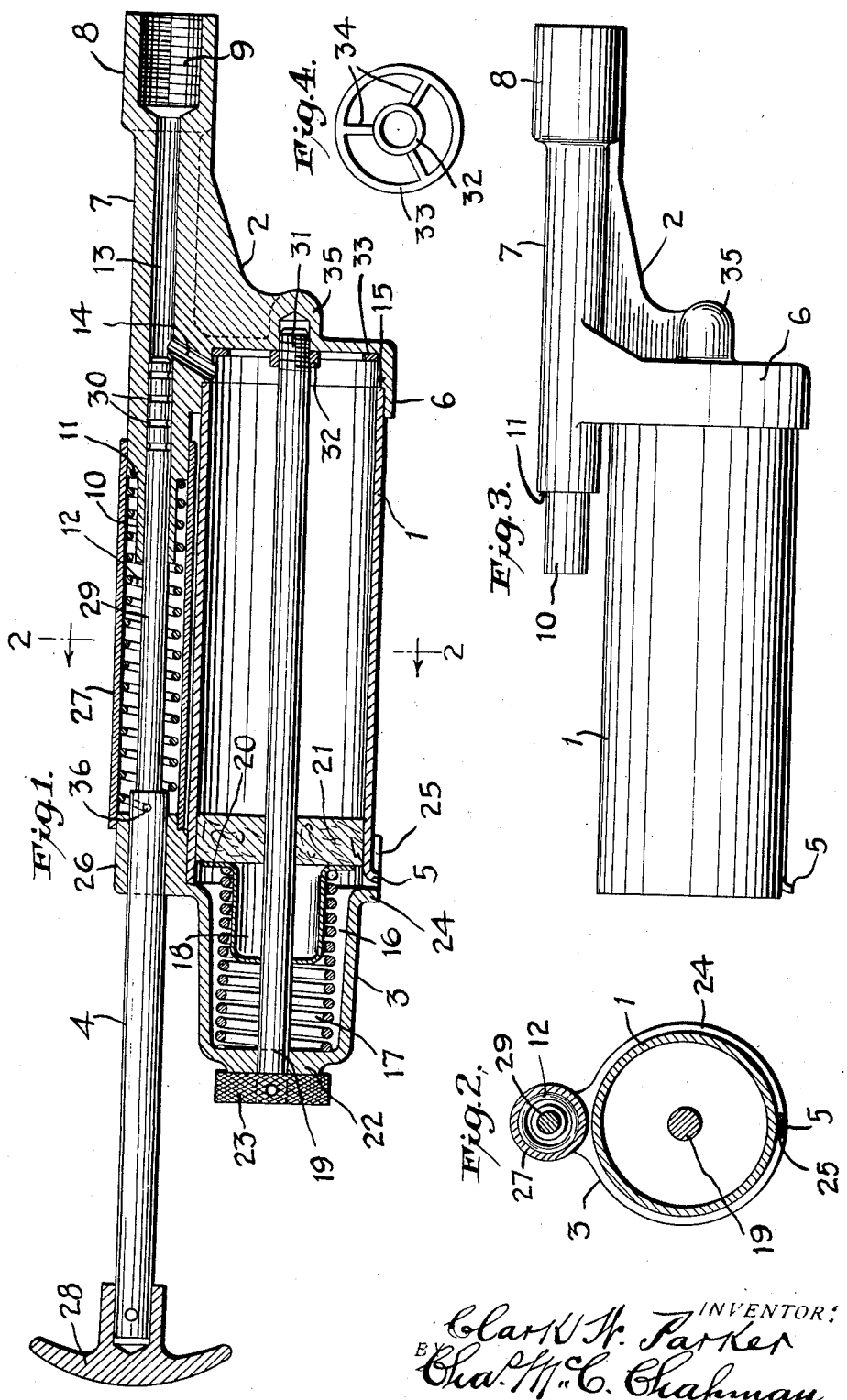

1,926,495

UNITED STATES PATENT OFFICE 1,926,495

GREASE GUN

Clark W. Parker, New York, N. Y., assignor, by mesne assignments, to The Lubrication Corporation, South Bend, Ind., a corporation of Delaware Application November 21, 1928
Serial No. 320,831

11 Claims. (Cl. 221—47.3)

This invention has reference to the lubricating art, and particularly relates to a high pressure grease gun or compressor adapted for the lubrication of the bearings of machinery and various other parts of the latter, the lubricant being supplied under pressure continuously and automatically, and periodically, as may be required, having high pressure applied thereto. My gun or compressor of the present invention is adapted to supply either oil or grease of varying density or thickness.

Among the objects of my invention may be noted the following: To provide a grease gun or compressor which is efficient, strong, durable, easily assembled and dismantled, made of few parts which are economical to build, and which may be made of light castings or drawn metals; to provide a grease gun in which the lubricant is constantly under pressure and is constantly and automatically fed to the delivery tube or conduit, in which latter the said lubricant may be subjected, as required or desired, to high pressure manually imposed; to provide a grease gun of large capacity which may be readily filled from the usual containers found on the market, and which when filled can be reassembled quickly and easily; to provide a grease gun which is composed of two principal assemblies which are readily associated and dissociated when and as desired, and which can be easily repaired or the parts thereof replaced economically and by one not skilled in the art or particularly familiar with the structure; and to provide a combination of means adapted for the uses and purposes outlined in the foregoing which can be easily handled, and which enables a firm and strong grip to be applied thereto during use and while thus firmly gripped can be caused to impose high pressure upon the lubricant.

With the above objects in view, and others which will be detailed during the course of this description, my invention consists in the parts, features, elements and combinations thereof hereinafter described and claimed.

In order that my invention may be clearly understood, I have provided drawings wherein:

Figure 1 is a longitudinal central sectional view showing the details of my grease gun or compressor;

Figure 2 is a cross-sectional view taken on the line 2—2 of Figure 1;

Figure 3 is a view of the gun barrel and delivery spout or tube, separated from the rest of the gun to demonstrate the simplicity of my invention;

Figure 4 is a plan view showing a form of spider or means carried by the assembly rod and adapted to apply pressure, when desired, upon the plunger carried by said rod;

Figure 5 is a view similar to Figure 1, but showing a form of my invention wherein the booster is actuated by a lever enabling exceedingly high pressure with a minimum of effort; and Figure 6 is a view showing the gun of Figure 5 in side elevation and partly in section, and showing the foldable lever in position for packing or transportation.

Referring to the drawings, and, first, to the form of my invention shown in Figures 1 to 4, the numeral 1 designates the gun barrel or grease shell, 2 the delivery tube or spout, 3 the closure or cover, and 4 the plunger or booster rod.

The barrel 1 may be a casting and may be cast in one with the body casting 2; but, I prefer to make the barrel of metal tubing which will be light and strong. The barrel may be of any desired length and of any desired diameter, according to the capacity desired for the gun. As shown in Figures 2 and 3, the barrel 1 is provided at its inner end with a tongue 5 struck up therefrom by suitably splitting the metal, said tongue being turned outwardly for a purpose presently described. The tongue may, however, be made as a lug secured to the barrel.

The delivery spout 7 of the grease gun is tubular in shape and may be formed integrally with the body casting 2. The casting 2 is further formed to provide a cylindrical seat and closure for the forward end of the barrel 1 as when the barrel is of tube stock as shown. The delivery spout 7 terminates at its outer end in an enlargement 8 internally screw-threaded, as indicated at 9, Figure 1. At its rear end, the tubular member 7 is reduced, as at 10, to provide a shoulder 11 for seating and holding an expansion spring 12. The passage through the tube 7 is sufficiently large to permit of the free flow or passage of the grease or oil employed as a lubricant, and said passage, indicated at 13, terminates in a sizable chamber containing the screw-threads 9, into which is threaded the usual conduit which may be flexible, or which may be rigid and of the type shown in my pending application filed April 26, 1928, Serial Number 272,921. Leading from the rim at the bottom of the closure 6 is a diagonal passage 14 terminating in the passage 13 of the tubular member 7. Above the entrance to the passage 14, the cover 6 is provided internally with a circumferential shoulder 15 adapted to receive the outer end of the barrel 1. Preferably, the barrel 1 and the closure 6 are welded or brazed together, or otherwise securely fastened together so as to make a grease-tight seal between the parts and enable the barrel and the delivery spout to be manipulated as one.

The cover closure 3 may be a casting or otherwise economically produced, and is shown in Figure 1 as consisting of a hollow member providing a chamber 16 for an expansion spring 17 encircling the thimble 18 and the coupling rod 19. The thimble is flanged at its open end, as indicated at 20 providing a seat for the spring and also a sustaining wall for the plunger 21 which may be made of heavy leather, cork, dense felt of soft metal, the desire being to make the plunger sufficiently strong and extensive to create a grease seal in cooperation with the barrel. The closure 3 is provided at its outer end with a reduced portion 22 affording a seat and an abutment for the knurled head 23 of the coupling rod 19, the head 23 being secured to the rod in any suitable manner, detachably, if desired. At its inner end the closure 3 is provided with a deep flange 24 slotted at one side, as at 25, for the reception of the lug 5 on the barrel 1, thus providing a detent to prevent the closure turning on the barrel. At one side, the flange 24 is enlarged to provide a tubular bearing 26 for the plunger 4, which bearing is sufficiently extensive to prevent angular movement of the plunger. At the juncture of the enlargement 26 with the flange 24, a shoulder is provided for the reception of the adjacent end of the tubular spring cover 27, said cover, if desired, being fixed, in any suitable manner, to the enlargement 26. At its outer end, the cover 27 encircles the tubular member 7 of the delivery spout, sufficiently extensively to provide a firm bearing and connection between the tube 7 and the shoulder 11. The plunger rod 4 is provided with a handle 28 secured to the rod in any suitable manner detachably, if desired, the handle being preferably circular and rounded on its outer surface, and made smooth so that the hand of the operator may be pressed thereagainst without discomfort. The plunger rod 4 has a reduced extension 29, which may be an integral portion of the rod 4, or may be secured thereto in any suitable manner, detachably if desired. At its outer end, the rod extension 29 plays within the tubular members 7 and 10 of the spout, and is provided at its extreme end with a plurality of grooves 30 adapted to receive the grease or oil in the tube and provide for lubrication. The said grooves also enable the air bubbles to escape while the plunger is reciprocated.

The coupling rod 19 is provided at its outer end with a circular spider turned upon the screw-threads 31 of said rod through the medium of its hub 32, said spider being composed of a skeletonized disk leaving a circumferential ring 33 and legs or connecting bars 34 sufficiently strong to prevent the disk from flexing when pressed through the body of grease in the barrel 1. The spider is of a diameter to extend from the rod 19 to the wall of the barrel 1, and said spider normally lies on the bottom of the closure member 6, so as not to obstruct the passage 14, the outer surface of said member being enlarged at 35 and internally screw-threaded to receive the threaded end of the rod 19.

From the foregoing description, it will be readily understood that the parts are assembled by entering the rod 19 with its plunger 21, thimble 18 and spring 17 into the barrel 1, the spider at the outer end of the rod sliding snugly in the barrel, enabling the threaded end of the rod to readily find the entrance to the threaded aperture in the enlargement 35 of the cover. Simultaneously with the foregoing, the lug 5 enters the slot 25 in the flange 24, and the plunger extension 29, spring 12 and its cover 27 are readily slid into the position shown in Figure 1. When the parts are all in the position indicated, the knurled head 23 of the coupling rod 19 is manipulated to screw the rod into the enlargement 36, and thus securely bind all the parts together. It will be understood that when the barrel 1 is empty, the plunger 21 will be at rest against the spider at the outer end of the rod and the spring 17 will be expanded to its fullest extent. The parts can now be dissociated for the purpose of filling the barrel 1 by manipulating the handle 23 and unscrewing the end of the rod from the enlargement 35. When the rod is released, it will be drawn outwardly, the spider engaging the plunger 21, and all parts being prevented from separation by the spider and the handle 23. The pull of the spider upon the plunger is transmitted through the spring to the end of the cover 3, so that the latter is withdrawn from the barrel 1, taking with it the plunger 4—29, the spring 12, and its cover 27, leaving only the barrel 1 and the delivery spout 2, as shown in Figure 3. The barrel can now be filled with grease or oil and, if heavy grease is used, the open end of the barrel is forced into the can of grease until the barrel is approximately filled. Then the coupling rod 19 with its spider and other parts, including the cover 3, are replaced, the spider, rod, plunger and other parts going readily into place until the two main assemblies are coupled together by screwing the coupling rod end 31 into the enlargement 35, as shown in Figure 1. With the barrel full of grease, the plunger will be forced backwardly along the coupling rod 19 compressing the spring 17, and the two assuming the position shown in Figure 1. In this relation of parts, and with the usual conduit with valved coupling applied to the spout member 8, the plunger under spring pressure will be in condition to continuously and automatically force a stream of grease or other lubricant into the passage 13 through which it can be forced under high pressure to unseat the seal in the coupling, and also in the fitting so that the grease can be injected into the bearings and into or onto other parts to be lubricated. If undue resistance is found to exist in the travel of the grease through the conduit and fitting, the plunger can be used as a booster to overcome the resistance and break the seal in the line of feed by sharp and forceful blows upon the handle 28. With the parts shown assembled, as in Figure 1, the barrel is held in the palm of the hand, the fingers passing around the tube 27, thus enabling the user to obtain, or hold the compressor in, such a strong grip as to eliminate any possibility of the compressor slipping in the hand when the booster is manipulated as suggested. Very high pressure can be imposed upon the mass of grease in the barrel 1 for normal feeding purposes; but, extraordinary high pressure can be imposed upon the rod 4 by mere pressure upon the handle 28, which pressure may be very greatly increased for grease boosting purposes by heavy blows upon said handle 28. In assembling, the spider on the end of the coupling rod 19 will readily pass through the body of grease in the barrel 1 due to the large openings in the spider and the legs 34 which practically cut their way through.

When the booster 4—29 is employed, for high pressure purposes, the spring 12 is compressed and, when the booster is relieved of pressure, the spring returns it to normal position back of the passage 14, through which latter the grease is constantly and automatically fed by the plunger 21. The booster rod is limited in its movement by the end 36 of the spring 12 which passes through an aperture in the inner end of the part 4, engaging the bearing 26, said connection between the spring and the booster acting also to compress the spring 12 and receive pressure of the said spring to return the booster to normal position and tend to maintain it there. It will be seen that my gun is light and strong, and, being slender, can be firmly gripped and held while in use and can be presented closely to the machinery for service, if required; and my gun can be manipulated by one hand until the booster effects are required. It is to be noted also that my gun has no exposed, fragile or frangible parts, that it may be thrown about with impunity, and that dirt, dust and grit cannot penetrate nor injure it. The gun can be made of any capacity according to the use or service to which it is to be applied or is in contemplation; that is to say, the gun may be made of a size for use by the owner of an automobile and to be placed in his tool kit, or it may be made of a portable size adapted for use in service stations and capable of being easily carried about a car which is to be lubricated, or it may be made of a much larger size and placed on a truck so that it may be wheeled about an extensive service station for frequent use in servicing cars, trucks, etc.

In the form of my invention shown in Figures 5 and 6, a lever type of gun is shown capable of imposing upon the booster rod approximately twice the pressure capable of being imposed thereon by the means shown in Figures 1 to 4, inclusive. Many of the features in the lever type of gun are similar to those shown in the push-rod type of gun and, in the following description, similar parts will be indicated by similar reference characters. In Figure 5, the plunger is shown half way down the cylinder 1 as though the latter were half full of grease. In this form of my invention, I have omitted the interlocking means 5—25 shown in Figure 1, as the same is not an absolute essential since the parts will be so tightly coupled together as to eliminate the necessity for a detent to prevent the one assembly part turning relatively to the other.

In the lever type of compressor or gun, the cover closure 3 is provided with a bifurcated lug 37, in which one end of a link 38 is pivoted, the other end being pivoted in a bifurcated extension 39 of a socket 40 pivotally connected at 41 to a member 42 fixed to the reduced end 43 of the booster rod 4. The socket is thus capable of a swinging movement about the lug 37 when the booster rod is manipulated to impose high pressure upon the grease in the passage 13 of the spout 7. Fixed in the socket 40 is a rod 44, the outer end of which extends considerably beyond the end of the socket and is provided with a V-shaped notch 45 adapted to engage the inner end of a tubular handle 46, the outer end of which is provided with a plug 47 having an apertured ear 48 in which is hooked the outer end of spring 49, the inner end of which is hooked into the outer end of the rod 44. By this means, the tension of the spring 49 will normally hold yieldingly the tubular handle 46 in the socket 40, while the rod 44 will brace and snugly fit the handle. When it is desired to use the gun for the purpose of high pressure grease boosting, the handle will be extended, as in Figure 5, and can be readily manipulated to reciprocate the booster rod 4—29 so as to impose exceedingly high pressure upon the column of grease in the passage 13 which is being automatically fed through the passage 14 from the cylindrical barrel 1 under the impulse of the plunger 21 under pressure of the spring 17. When it is desired, however, to pack, ship, place the gun in the tool kit, or carry it conveniently; the tubular telescoping handle 46 will be drawn outwardly from the bar 44, until the handle 46 breaks joint with said bar. Then the handle is turned into parallelism with the plunger 4, and the spring 49 now under high tension will instantly draw the tubular handle 46 into the notch 45 of the bar 44, and will retain it thus under considerable tension until it is desired to again use the gun. As suggested, the foldable, telescoping handle type of gun is very convenient and can be readily placed in a carton for transportation, or with a number of others for expressing or for mailing. The leverage of the handle can be increased to any desired extent beyond the length which is required for the mere purpose of gripping and manipulation.

The function of the grease gun in the Figure 5 construction is the same as that of the Figure 1 construction, save in the matter of the high pressure boosting enabled by the lever mechanism. In dissociating the parts, the handle 23 is readily manipulated by spanning either the link 38 or the rod 4 or the socket 40 with the fingers, and, when the cover closure 3 is withdrawn from the cylinder 1, the lever is convenient for manipulation of the parts; and this is also true in associating the parts after filling the barrel 1 with grease.

Having thus described my invention, what I claim and desire to secure by Letters Patent is:

1. A lubricating gun comprising a barrel, a member forming a closure therefor and having a spout eccentrically located thereon parallel therewith and in extension thereof, booster mechanism carried by the barrel including a cover closing the latter at one end and a spring controlled plunger operated in said spout, and coupling means between the booster mechanism and said closure member for holding the several parts removably together.

2. A lubricating gun comprising a barrel having a spout mounted thereon in extension of the delivery end thereof, a closure for the other end of said barrel, said closure carrying a spring-controlled booster adapted to operate in the extended spout, and coupling means passing through the closure and entering a member of the spout for securing the several parts removably together.

3. A lubricating gun comprising a barrel having a member at the delivery end forming a closure therefor and provided with a spout extending parallel to the barrel, a closure for the other end of the barrel, a booster piston mounted on the said closure parallel with said barrel and adapted to operate in said spout, a rod extending through the closure, the barrel and into said member at the delivery end of the barrel, for coupling the several parts together, and means within the barrel for automatically feeding lubricant therefrom into the spout.

4. A lubricating gun comprising a body member having a discharge orifice, a second member in substantial alignment with said body member, means for supplying lubricant under constant pressure to said discharge orifice, booster means for increasing the pressure of lubricant supplied by said first named means, each of said means including elements carried by said body member and elements carried by said second member, and a single coupling member for removably holding said substantially aligned members and their associated elements in operative relationship.

5. A lubricating gun comprising a cylindrical reservoir, a delivery spout at one end of the reservoir providing a booster cylinder and a discharge passage disposed with their axes parallel to the axis of the reservoir, a member forming a closure for the opposite end of the reservoir detachably secured thereto, automatic means carried by said member for imposing pressure upon the lubricant in said reservoir, and a manually operated booster piston assembly carried by said member and arranged for operative disposition of said booster piston in said booster cylinder when said closure member is attached to said reservoir.

6. A lubricating gun comprising a body, a barrel carried by said body, a tubular lubricant delivery spout providing a booster cylinder and a discharge passage located on said body with the axes of the cylinder and passage parallel to the axis of said barrel, a cover member for the opposite end of the barrel, a booster plunger mounted upon said cover member and adapted to operate in said booster cylinder, plunger controlling means disposed between said body and said cover member, and coupling means between said cover member and said body for holding the several parts removably together.

7. A lubricating gun comprising a barrel of large diameter for holding the lubricant, means carried by the barrel whereby the lubricant therein may be driven therefrom, a spout of small diameter carried by and extending along the barrel, a plunger mounted on and extending along the barrel and operating within the spout, a spring for retracting the plunger and surrounding the latter, and a tubular member also of small diameter surrounding the plunger and covering the said spring whereby during the operation of the gun or the plunger the gun may be firmly gripped by the hand and fingers of the user.

8. A gun for lubricating purposes having two assembly sets of mechanism, one set comprising a grease barrel, a closure for one end of the barrel and an integral delivery spout offset from the barrel, and the other set comprising a cover for the other end of the barrel, and a plunger for the spout, and means including a rod extending through the cover, barrel and into the closure for coupling the two assemblies together.

9. A grease gun comprising a cylindrical receptacle having in its outer end a recess, a passage leading from said recess, a booster mounted on the receptacle and having a passage therethrough communicating with the passage leading to said recess, a piston within the receptacle, and means for causing the same to automatically force grease from the receptacle, a tie-rod on which the piston is mounted, and a spider carried by one end of the tie-rod and normally located in the recess, whereby the piston is prevented from entering said recess, substantially as described.

10. A grease gun having, in combination, a grease holder, a delivery spout having an enlarged portion in which one end of the holder is set; a cover having an extension in which the opposite end of the holder is set, means extending through the cover, holder and into the spout enlargement securing them all together, a small cylinder arranged between the spout and cover and parallel with and close to the holder, a plunger operating through extensions of the cover and spout and in the latter, and means for actuating the plunger, the arrangement of the parts providing a compact structure which can be firmly gripped in the hand and by the fingers.

11. A grease gun comprising, a low pressure open ended cylinder of relatively large volume, an open ended cylinder of relatively small diameter disposed alongside of and substantially parallel to said low pressure cylinder, a single member at once forming a closure for the low pressure cylinder and a support for the small cylinder at adjacent ends of said cylinders at one end of each, a high pressure chamber substantially in alignment with said cylinder of small diameter, said closure member providing a passageway between said low pressure cylinder and the high pressure chamber and an outlet from the latter, a second closure member at once forming a closure for the other end of the low pressure cylinder and a support for the adjacent end of said small cylinder, a high pressure piston for said high pressure chamber, means passing through said small cylinder and through said second closure for operating said piston, a follower in said low pressure cylinder, and means for securing said closures together with said cylinders clamped therebetween.

CLARK W. PARKER.